(12) United States Patent
Ichikawa

(10) Patent No.: US 6,435,790 B1
(45) Date of Patent: Aug. 20, 2002

(54) COMPONENT ATTACHMENT APPARATUS

(75) Inventor: Kouji Ichikawa, Aichi-ken (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 09/905,202

(22) Filed: Jul. 16, 2001

(30) Foreign Application Priority Data

Jul. 21, 2000 (JP) ....................................... 2000-220645

(51) Int. Cl.$^7$ ............................................... F16B 13/04
(52) U.S. Cl. ........................... 411/349; 411/21; 24/453; 24/DIG. 56
(58) Field of Search ............................. 411/21, 22, 349, 411/549, 553, 508, 913; 24/297, 453, DIG. 56

(56) References Cited

U.S. PATENT DOCUMENTS

| | | | |
|---|---|---|---|
| 4,762,437 A | | 8/1988 | Mitomi |
| 4,927,287 A | | 5/1990 | Ohkawa et al. |
| 4,956,900 A | * | 9/1990 | Mair |
| 5,173,025 A | * | 12/1992 | Asami |
| 5,346,349 A | * | 9/1994 | Giovannetti |
| 5,370,484 A | | 12/1994 | Morikawa et al. |

FOREIGN PATENT DOCUMENTS

| | | | |
|---|---|---|---|
| GB | 1256295 | * | 12/1971 |
| GB | 2 265 661 | | 10/1993 |
| GB | 2 352 474 | | 1/2001 |
| JP | 2518870 | | 9/1996 |

* cited by examiner

*Primary Examiner*—Flemming Saether
(74) *Attorney, Agent, or Firm*—Kanesaka & Takeuchi (57) ABSTRACT

A component attachment apparatus is used for attaching a component in a panel hole of a panel and is formed of a grommet to be inserted into the panel hole to be incapable of rotation, and a pin. The grommet includes an insertion hole, an open part extending outwardly to cross the insertion hole, and a meeting part formed at least one side of the open part along the insertion hole. The pin includes a head part larger than the insertion hole, and a leg part extending from the head part and inserted into the insertion hole of the grommet to be capable of rotation. The leg part has a first catch elastically projecting outward from an outer perimeter of the leg part to couple in the panel hole, and a second catch positioned at a tip of the leg part for preventing escape of the leg part from the insertion hole. When the pin with the leg part is inserted into the insertion hole, the first catch is positioned in the open part to engage the panel. When the pin is rotated, the first catch is pushed inward by the meeting part to be located inside the grommet, so that the component attachment apparatus can be removed from the panel.

8 Claims, 7 Drawing Sheets

COMPONENT ATTACHMENT APPARATUS

BACKGROUND OF THE INVENTION

The present invention relates to an attachment apparatus that is capable of fixing, for example, two panels in an overlaid state, and the two panels can be easily separated by rotating a pin.

As a prior art, there is known, for example, a connecting tool (10) described in a publication of Utility Model Registration No. 2518870.

The above-mentioned connecting tool (10), as shown in FIGS. 1 and 2 in the same publication, generally was constituted by a screw body (20) and a receiving body (30). When the above-mentioned screw body (20), as shown in FIG. 6 in the same publication, is pushed into a coupling hole (38) of the receiving body (30), the external diameter of a pair of base parts (32) is enlarged, and it no longer escapes from the attachment hole of a panel (P).

On the other hand, during reuse of the connecting tool (10), the screw body (20) may be rotated by a jig with a screw driver head. By this, the screw body (20) is separated from the receiving body (30), and at this time, the external diameter of the pair of base parts (32) is returned to the original posture by the elastic returning force of a hinge (34).

However, the above-mentioned connecting tool (10) of the past had a problem that when the screw body (20) was inserted in the receiving body (30) for a long time, the external diameter of the pair of the base parts (32) would no longer contract, and removal from the attachment hole of the panel (P) became difficult.

Therefore, the present invention has been made in consideration of the above-mentioned problem of the prior art, and in a first aspect or object of the invention, a first catch or claw can contract surely by rotating a pin.

In a second aspect of the invention, in addition to the purpose of the invention described in the first aspect, the pin can be rotated easily via an operating part. In a third aspect of the invention, in addition to the first or second aspect of the invention, the first catch can easily contract. In a fourth aspect of the invention, in addition to the first to third aspects, because a leg part of the pin is held inside an insertion hole of a grommet, the leg part of the pin is not accidentally pushed from outside, and escape of the pin from the grommet can be prevented in advance.

In a fifth aspect of the invention, in addition to the purpose of the invention described in the first to fourth aspects, a clicking feeling or jointed feeling can be given during rotation. In a sixth aspect of the invention, in addition to the purposes of the invention described in the first to fifth aspects, escape of the pin can be prevented assuredly by the fact that a second catch or claw is inserted into a cut-out part of the grommet.

Further objects and advantages of the invention will be apparent from the following description of the invention.

SUMMARY OF THE INVENTION

The invention has been made in order to achieve each of the above-mentioned purposes, and the characteristic points of the invention are explained below.

In the first aspect, the attachment apparatus is used for attaching a component (for example a panel) to a panel hole of a panel. The attachment apparatus comprises a grommet and a pin. The above-mentioned grommet has an insertion hole, and it is inserted into the panel hole to be incapable of rotation. The pin is inserted in the insertion hole to be capable of rotation.

The pin comprises a head part, and a leg part. The head part is larger than the insertion hole. The leg part extends from the head part, and is inserted into the insertion hole.

The leg part comprises a first catch or claw, and a second catch or claw. The above-mentioned first catch projects elastically outward in the radial direction from the outer perimeter of the leg part, and it is coupled in the panel hole. The second catch is positioned more toward the tip of the leg part than the first catch, and it is used for preventing escape of the leg part from the insertion hole.

The grommet comprises an open part, and a meeting part. The open part runs or penetrate through in and out of a wall of the grommet, and allows the first catch to project outward. The meeting part is positioned forward in the rotational direction of the pin, and operates to meet the first catch and push the first catch inward in the radial direction when the pin is rotated.

In the second aspect, in addition to the characteristic points of the invention described in the first aspect, the head part of the pin includes an operating part. The operating part enables rotational operation of the pin.

In the third aspect, in addition to the characteristic points of the invention described in the first or second aspect, the meeting part of the grommet comprises an inclined surface. The inclined surface is designed to meet the first catch with an incline.

In the fourth aspect, in addition to the characteristic points of the invention described in any of the first to third aspects, the leg part of the pin is held inside the insertion hole of the grommet.

In the fifth aspect, in addition to the characteristic points of the invention described in any of the first to fourth aspects, there is provided respectively either an indented or raised part between the outer perimeter of the leg part of the pin and the inner perimeter of the insertion hole of the grommet. The indented and raised parts are used for coupling with each other in the state in which the first catch is inserted in the open part.

In the sixth aspect, in addition to the characteristic points of the invention described in any of the first to fifth aspects, the tip of the grommet, which is positioned forward in the direction of insertion of the leg part of the pin, has a cut-out part. The cut-out part is inserted into by the second catch in the position where the first catch is inserted into the open part.

DETAILED DESCRIPTION OF PREFERRED EMBODIMENTS

FIGS. 1–11 respectively show one example of the present invention.

Figure 1:
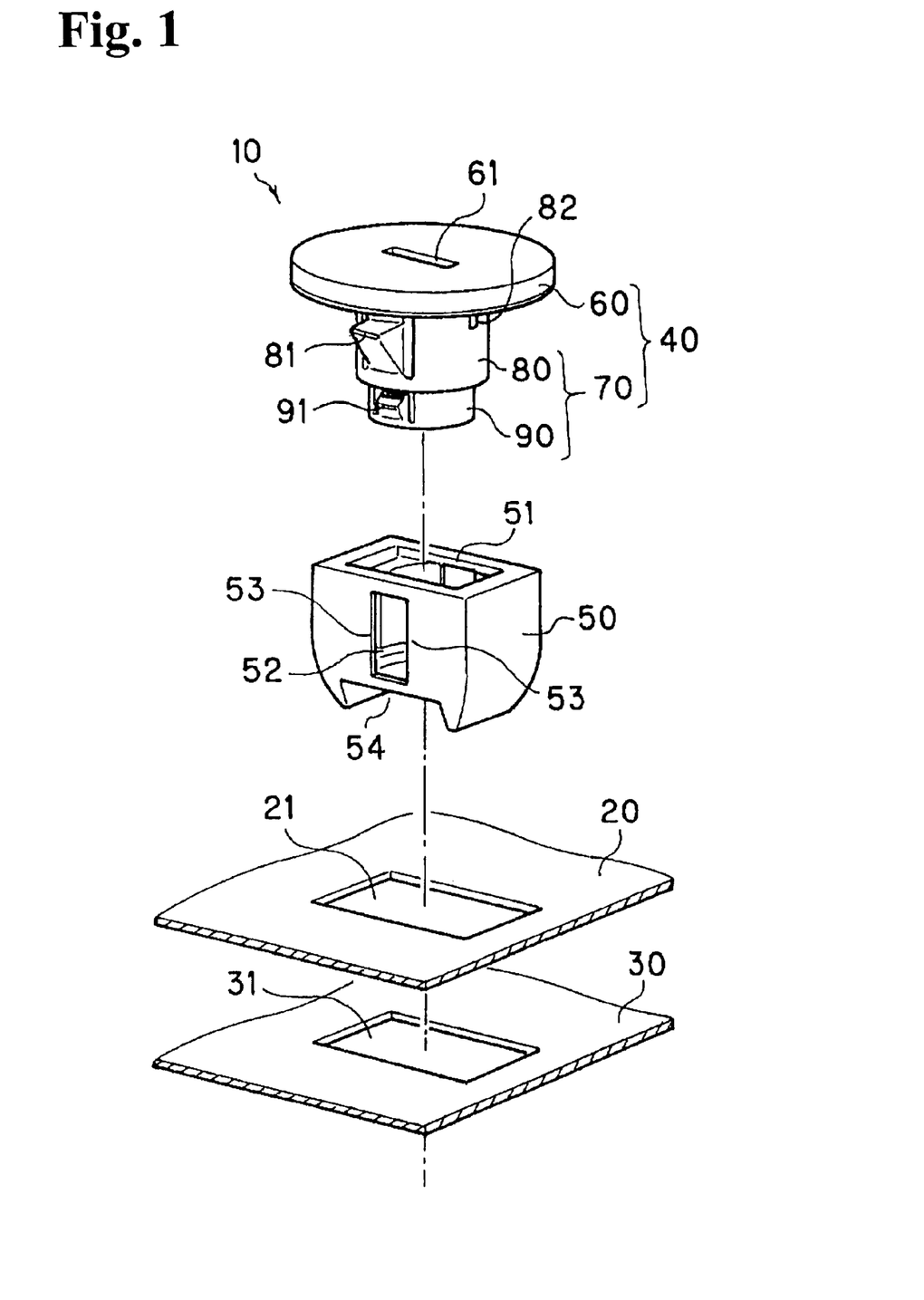
FIG. 1 is an exploded perspective view of the attachment apparatus.
Figure 2:
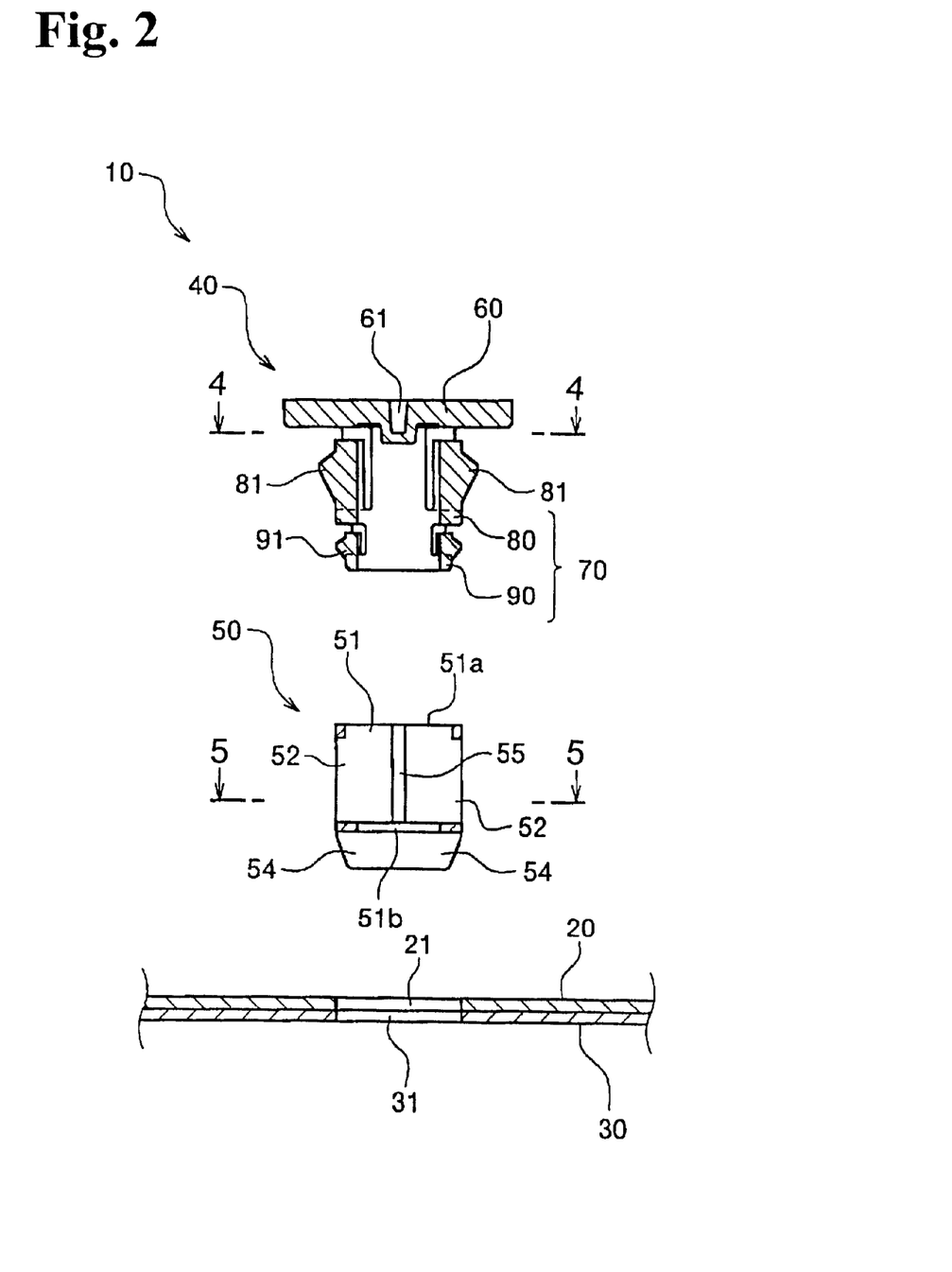
FIG. 2 is an exploded vertical sectional view of the attachment apparatus.
Figure 3:
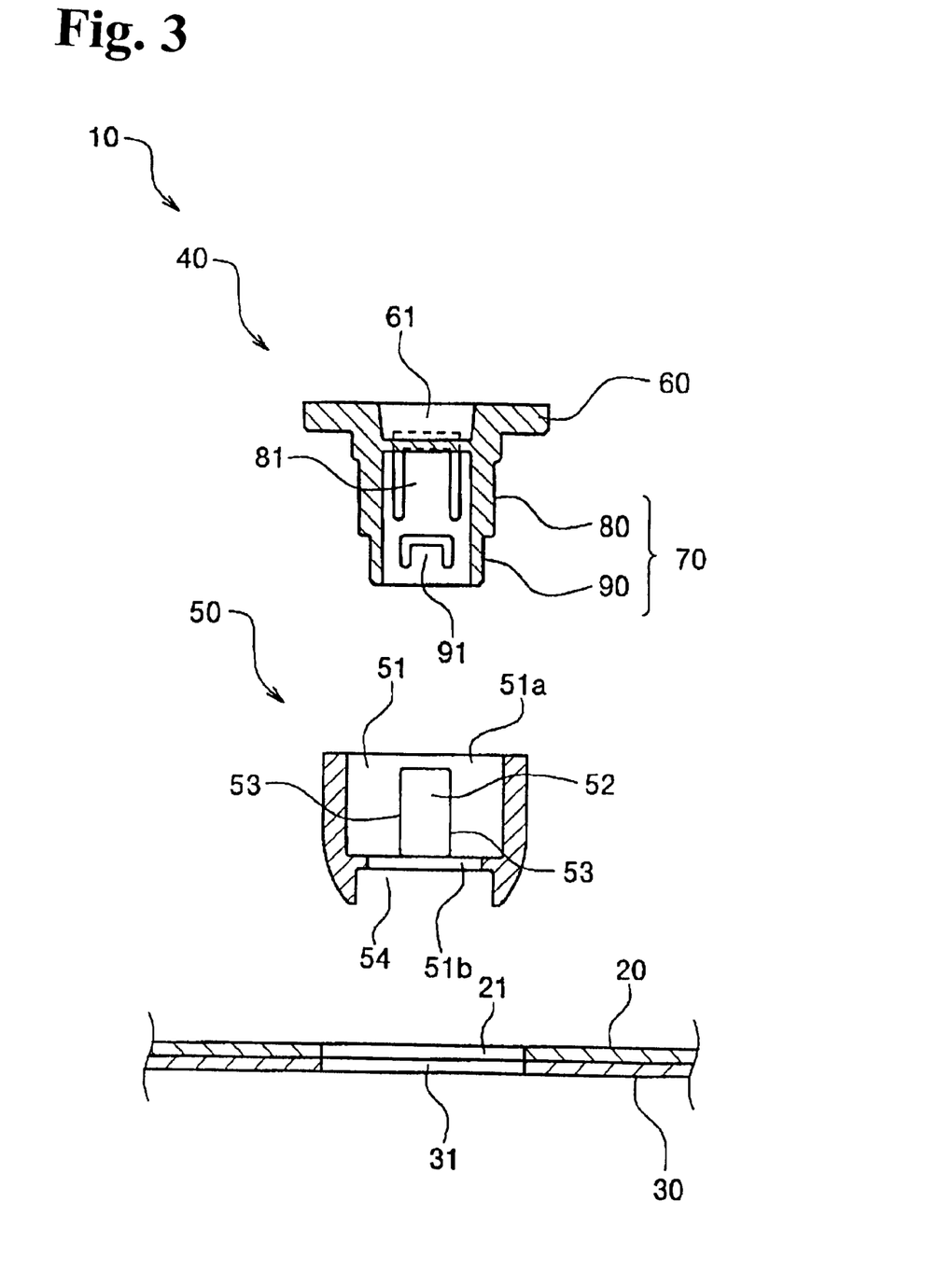
FIG. 3 is another exploded vertical sectional view of the attachment apparatus.
Figure 4:
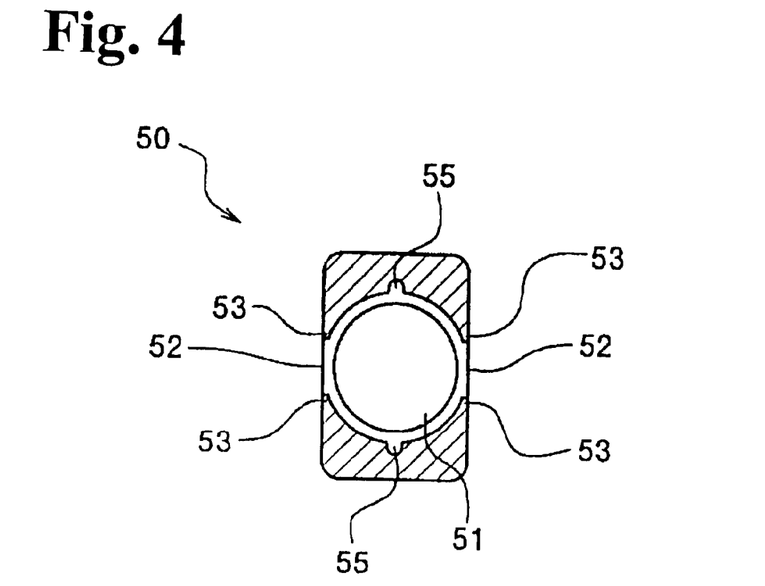
FIG. 4 is a sectional view of a grommet taken along line 4—4 in FIG. 2.
Figure 5:
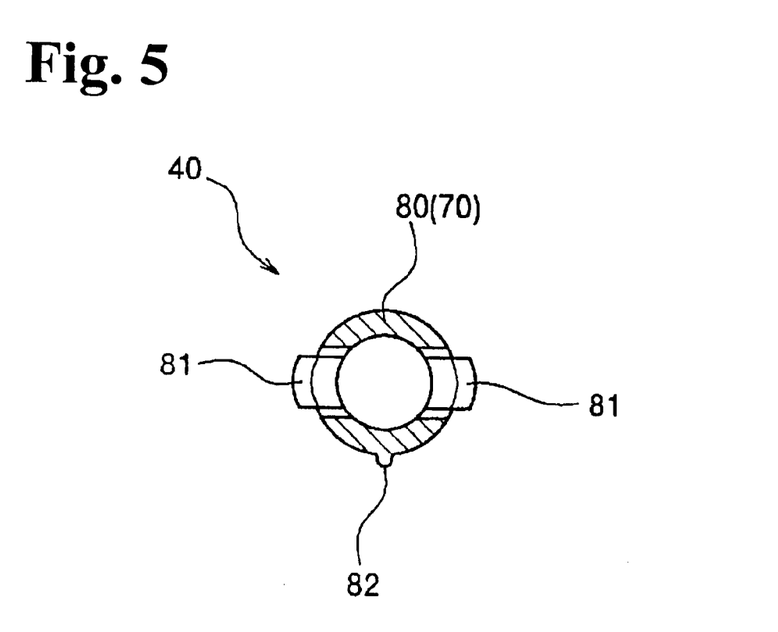
FIG. 5 is a sectional view of a pin taken along line 5—5 in FIG. 2.
Figure 6:
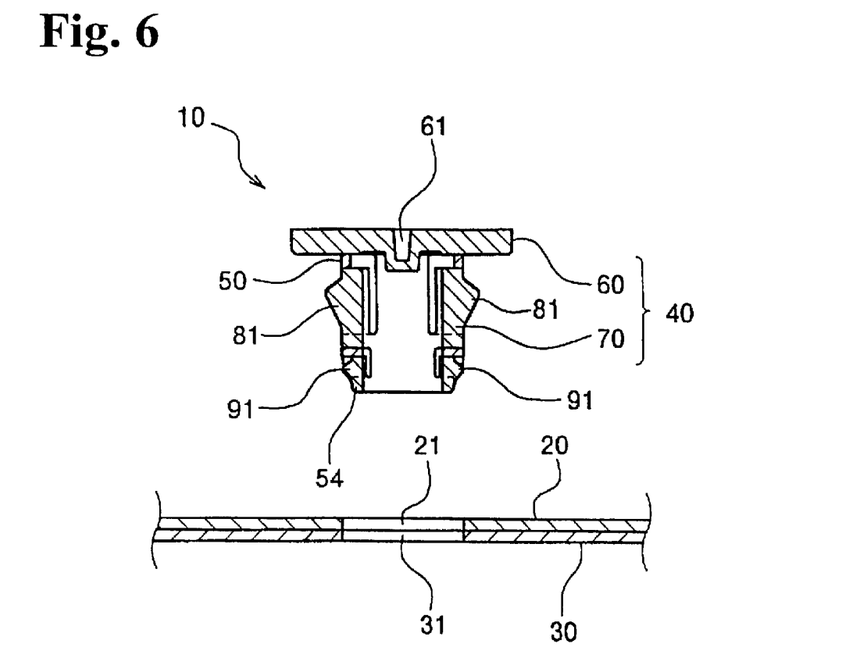
FIG. 6 is a vertical sectional view of the attachment apparatus showing an assembled state of the pin and the grommet.
Figure 7:
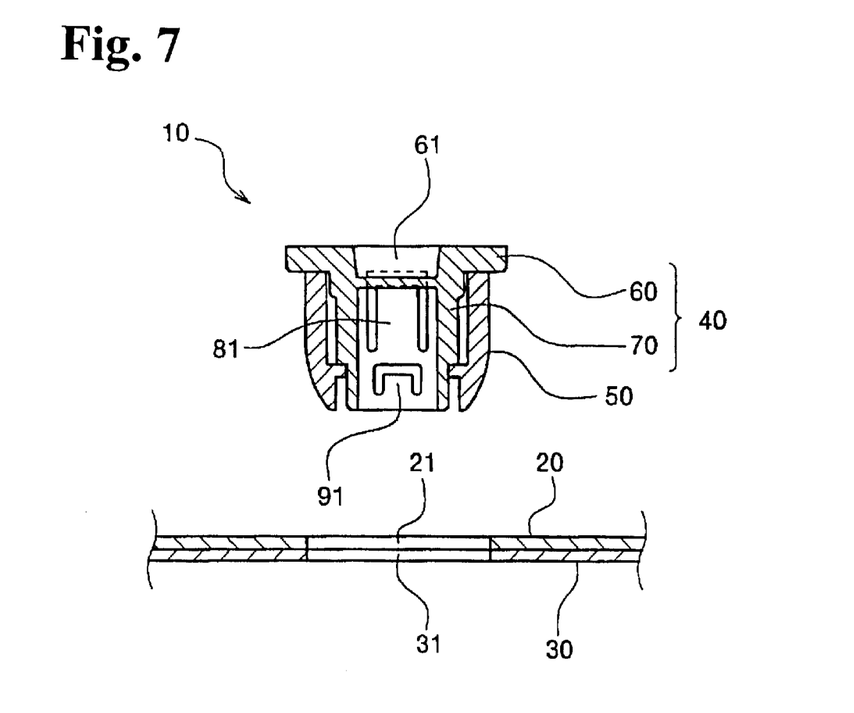
FIG. 7 is another vertical sectional view of the attachment apparatus showing the assembled state of the pin and the grommet.
Figure 8:
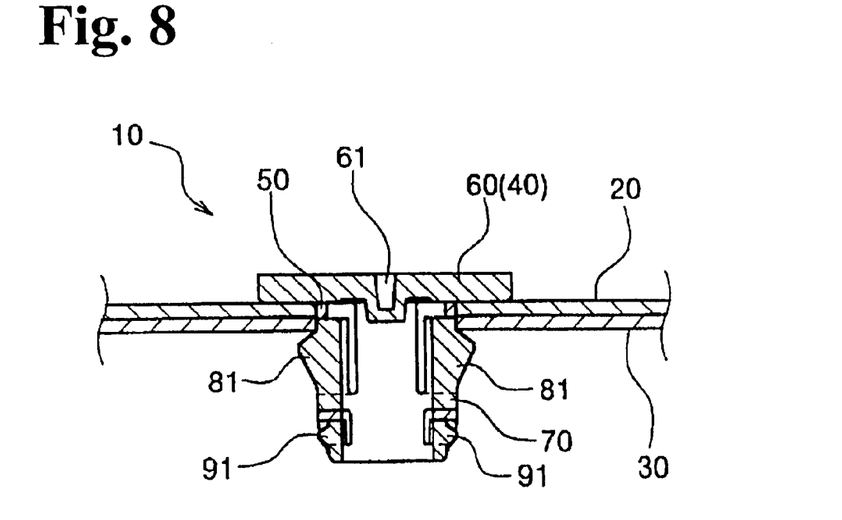
FIG. 8 is a vertical sectional view showing the attached state of the attachment apparatus.
Figure 9:
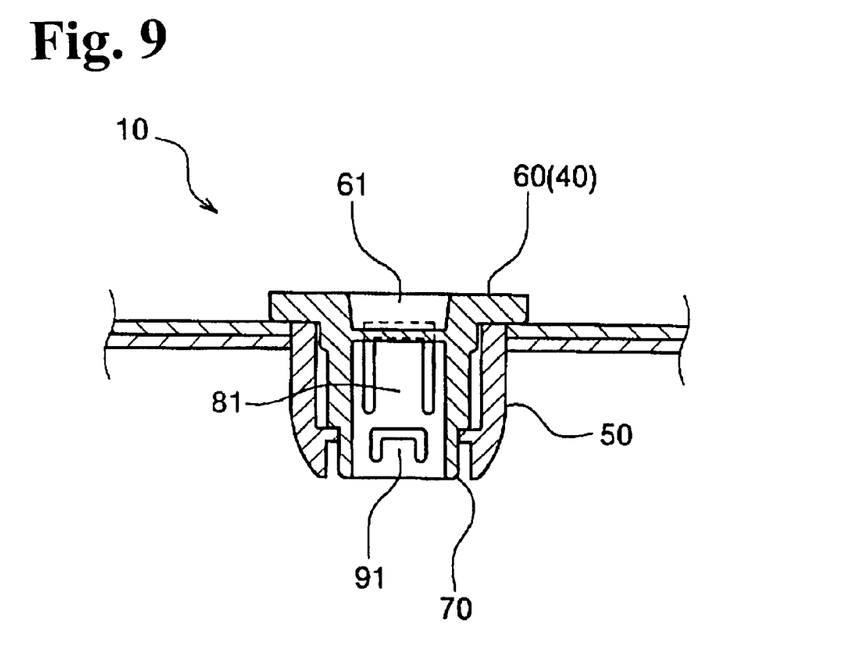
FIG. 9 is another vertical sectional view showing the attached state of the attachment apparatus.
Figure 10:
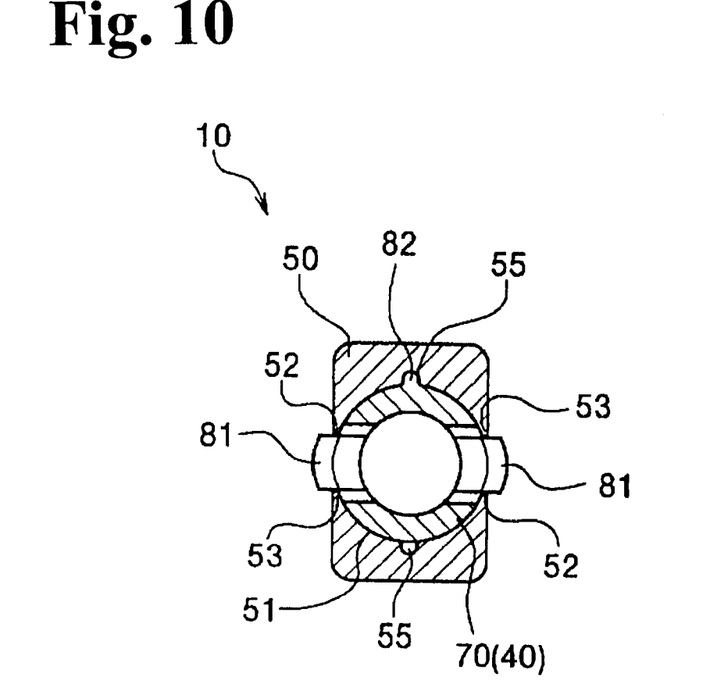
FIG. 10 is a horizontal sectional view of the attachment apparatus.
Figure 11:
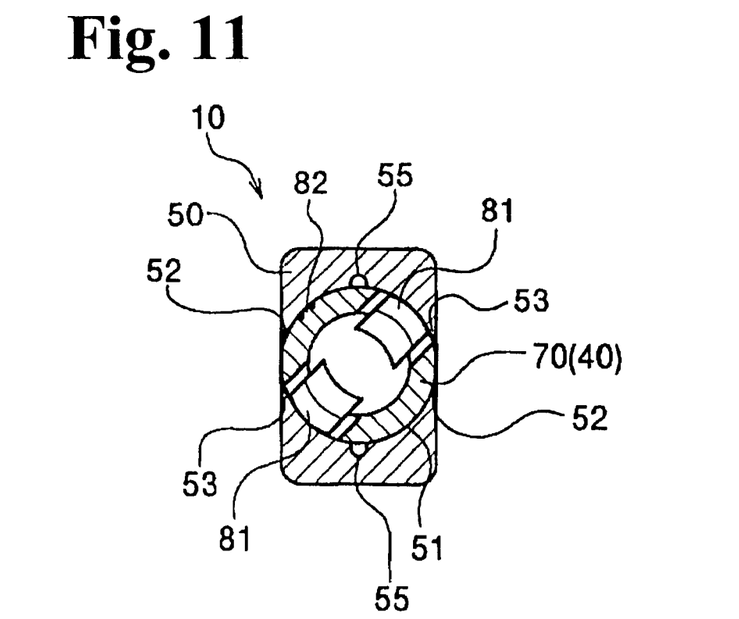
FIG. 11 is a horizontal sectional view showing the state in which the pin is rotated.

FIG. 1 is an exploded perspective view of the attachment apparatus. FIG. 2 is an exploded vertical sectional view of the attachment apparatus. FIG. 3 is another exploded vertical sectional view of the attachment apparatus. FIG. 4 is a sectional view of a grommet taken along line 4—4 in FIG. 2. FIG. 5 is a sectional view of a pin taken along line 5—5 in FIG. 2. FIG. 6 is a vertical sectional view of the attachment apparatus showing the assembled state of the pin and the grommet. FIG. 7 is another vertical sectional view of the attachment apparatus showing the assembled state of the pin and the grommet. FIG. 8 is a vertical sectional view showing the attached state of the attachment apparatus. FIG. 9 is another vertical sectional view showing the attached state of the attachment apparatus. FIG. 10 is a horizontal sectional view of the attachment apparatus. FIG. 11 is a horizontal sectional view showing the state in which the pin is rotated.

In FIGS. 1–3, numeral 10 indicates the attachment apparatus. The above-mentioned attachment apparatus 10 is for fixing, for example, two panels 20, 30 in an overlaid state, as shown in FIGS. 1–3.

Either one of the two panels 20, 30 is taken as the component, and the other of the two panels 20, 30 is taken as a base, so that the one panel 20 or 30 as the component is attached to the other panel 20 or 30 as the base. The component is not limited to the panels 20, 30, and the base also is not limited to the panels 20, 30. Also, as for the use of the attachment apparatus 10, it can be used widely for vehicles, such as automobiles, ships, and airplanes, and for houses, furniture, office tools, electronic products, and the like.

The above-mentioned two panels 20, 30 respectively are provided with square panel holes 21, 31, each of which runs or penetrates through the upper and lower surfaces, as shown in FIGS. 1–3. The size of the panel holes 21, 31 of the two panels 20, 30 may be the same or they may be different.

Meanwhile, the attachment apparatus 10, as shown in FIGS. 1–3, generally comprises a pin 40 and a grommet 50. The attachment apparatus 10 is not limited to the above-mentioned parts, i.e. pin and grommet, and it also may comprise other parts.

The pin 40 is integrally molded, for example, from a resin having suitable rigidity and elasticity, for example, POM. Specifically, the pin 40, as shown in FIGS. 1–3, generally comprises a head part 60, and a leg part 70. The pin 40 is not limited to the above-mentioned parts, i.e. head part and leg part, and it also may comprise other parts.

The head part 60, as shown in FIGS. 1–3, forms a flat circular shape, and its outer diameter is set larger than the inner diameter of the panel hole 21 of the upper panel 20. Also, the outer diameter of the head part 60 is set larger than the outer diameter or external shape of the grommet 50. The shape of the head part 60 is not limited to a flat circular shape, and it also may be formed in a flat square shape.

The head part 60, as shown in FIGS. 1–3, includes an operating part. 61. However, the head part 60 is not limited to have the operating part 61, and it also may comprise another part. The operating part 61 is formed into a minus-shaped slot. Also, although it is not illustrated, the operating part 61 is made to be able to rotate the pin 40 by inserting a blade of a minus or straight-edge screw driver. The operating part 61 is not limited to a minus-shaped slot, and it also may form a plus-shaped or phillips slot, or a wrench socket, or head part 60 may be formed in a bolt shape. Also, it is not limited to a screw driver, and a common tool, such as wrench or spanner, may be used.

A leg part 70, as shown in FIGS. 1–3, generally comprises a first leg 80, and a second leg 90. The leg part 70 is not limited to the above-mentioned parts, i.e. first leg and second leg, and it also may comprise other parts.

The first leg 80, as shown in FIGS. 1–3 and FIG. 5, extends cylindrically from the lower surface of the head part 60. The above-mentioned first leg 80, as shown in FIGS. 1–3 and FIG. 5, includes a first catch or claw 81, and a raised part 82. The first leg 80 is not limited to the above-mentioned parts, i.e. first catch and raised part, and it also may comprise other parts.

The first catch 81, as shown in FIGS. 1–3 and FIG. 5, projects elastically from the outer perimeter of the first leg 80, and two first catches are totally provided at a 180-degree interval. The number of the first catches 81 is not limited to two, and one or three or more also may be provided.

The raised part 82, as shown in FIG. 5, projects semicircularly in section from the outer perimeter of the first catch 81, and one is provided at the position shifted at 90 degrees with respect to the first catch 81. The number of the raised parts 82 is not limited to one, and two or more also may be provided.

The second leg 90, as shown in FIGS. 1–3, extends cylindrically from the tip of the first leg 80 and is thinner. The above-mentioned second leg 90, as shown in FIGS. 1–3, includes a second catch 91. The second leg 90 is not limited to the above-mentioned part, i.e. second catch, and it also may comprise another part.

The above-mentioned second catch 91, as shown in FIGS. 1–3, projects elastically from the outer perimeter of the second leg 90, and two second legs 90 are totally provided at a 180-degree interval. Also, each second catch 91 is positioned immediately beneath each first catch 81. The number of the second catches 91 is not limited to two, and one or three or more also may be provided.

The grommet 50, as shown in FIGS. 1–4, is formed to have an outer diameter equal to or less than the inner diameter of panel holes 21, 31 of the two panels 20, 30, for example, to a roughly equal square hollow shape. Also, the grommet 50, just as the pin 40, is integrally molded, for example from a resin having suitable rigidity and elasticity, for example POM.

The above-mentioned grommet 50, as shown in FIGS. 1–4, generally comprises an insertion hole 51, an open part 52, a meeting or abutting part 53, a cut-out part 54, and an indented part 55. The grommet 50 is not limited to the above-mentioned parts, and it also may comprise other parts.

The insertion hole 51, as shown in FIGS. 1–4, is formed circularly in section, running through the top and bottom of the grommet 50. The inner diameter of an entrance side 51a of the above-mentioned insertion hole 51, that is, the top side in FIGS. 1–3, is set to greater than or equal to the first leg 80 of the pin 40, for example roughly equal. Also, the inner diameter of an exit side 51b of the insertion hole 51, that is, the bottom side in FIGS. 1–3, is set narrower than the inner diameter of the aforementioned entrance side 51a, and greater than or equal to the outer diameter of the second leg 90, for example roughly equal.

Also, as shown in FIGS. 6–7, it is made such that the leg part 70 of the pin 40 is held inside the insertion hole 51. Specifically, the entire length of the insertion hole 51 is set to greater than or equal to the entire length of leg part 70 of the pin 40, for example roughly equal. By this, the leg part 70 of the pin 40 is not accidentally pushed, and escape from the grommet 50 can be prevented in advance.

An open part 52, as shown in FIG. 10, allows the first catch 81 to project outward. Specifically, the open part 52, as shown in FIGS. 1–4, runs through squarely in the inner portion or wall of the grommet 50, and two open parts 52 are provided at a 180-degree interval just as the first catches 81. The number of the open parts 52 may be equal to or above the number of the first catches 81.

The meeting part 53, as shown in FIGS. 1–4, is positioned forward in the rotational direction of the pin 50. The meeting part 53 meets the first catch 81 when the pin 40 is rotated, and as shown in FIG. 11, it pushes the first catch 81 inward in the radial direction. By this, when the pin 40 is rotated, the first catch 81 is pushed by the meeting part 53 and bends inward, and the first catch 81 assuredly can be contracted.

Also, although it is not illustrated, the meeting part 53 comprises an inclined surface for meeting the first catch 81 with an incline. By the action of the above-mentioned inclined surface, the first catch 81 easily can be contracted. Specifically, the meeting part 53, as shown in FIGS. 1–4, is positioned on the left and right side edges of the open part 52.

The cut-out part 54, as shown in FIG. 6, is inserted into by the second catch 91 of the pin 40, in the position where the first catch 81 is inserted into the open part 52. By this, escape of the pin 40 can be surely prevented by the fact that the second catch 91 of the pin 40 is inserted into the cut-out part 54 of the grommet 50.

Specifically, as shown in FIG. 1 and FIG. 3, a bracket-shaped cut-out part 54 is formed at the end surface of the grommet 50. Two cut-out parts 54 are totally provided at a 180-degree interval just as with the open part 52. Each cut-out part 54 is positioned immediately beneath each open part 52. The number of the cut-out parts 54 may be equal to or above the number of the second catches 91.

The indented part 55, as shown in FIG. 10, is inserted into by a raised part 82 of the pin 40. By this, a clicking feeling or jointed feeling can be given during rotation of the pin 40. specifically, the indented part 55, as shown in FIG. 4, sinks semi-circularly in section from the inner perimeter of the insertion hole 51, and two indented parts are totally provided with the position shifted at 90 degrees with the open part 52. The number of the indented parts 55 may be equal to or above the number of the raised parts 82, and one or three or more may be provided. Also, the raised part 82 was provided on the pin 40 and the indented part 55 was provided on grommet 50, but also conversely an indented part may be provided on the pin 40 and a raised part on the grommet 50.

The method of use of the attachment apparatus 10 having the above-noted constitution is explained below.

First, the leg part 70 of the pin 40, as shown in FIGS. 6–7, is inserted to fit inside the insertion hole 51 of the grommet 50. The pin 40 also may be inserted into the grommet 50 after inserting the grommet 50 into the panel holes 21, 31 of the two panels 20, 30.

When the leg part 70 of the pin 40 is inserted, its two second catches 91 are pushed by the inner perimeter of the insertion hole 51 and once bend inward. After that, the two second catches 91, as shown in FIG. 6, respectively, are inserted into the two cut-out parts 54 and return to the original position. By this, the leg part 70 no longer escapes from the insertion hole 51, and the pin 40 is fixed to the grommet 50.

Also, the two first catches 81 of the pin 40 are pushed by the inner perimeter of the insertion hole 51 and once bend inward. After that, the two first catches 81, as shown in FIG. 10, respectively, are inserted into the two open parts 52, and return to the original positions. At this time, the first catches 81 project horizontally from the open parts 52. Also, one raised part 82 of the pin 40, as shown in FIG. 10, is inserted into one of the two indented parts 55 of the grommet 50.

Meanwhile, the two panels 20, 30, as shown in FIGS. 6–7, are overlaid top and bottom, and the panel holes 21, 31 are aligned.

Next, the grommet 50 with the pin 40 inserted, as shown in FIGS. 8–9, is inserted to fit in the panel holes 21, 31. When the grommet 50 is inserted, the two first catches 81 which respectively project from the two open parts 52 are pushed by the inside edges of the panel holes 21, 31 and once bend inward. After that, the first catches 81, as shown in FIG. 8, return to the original positions on the back side of the panel 30. Because of this, the two panels 20, 30, as shown in FIGS. 8–9, are held in an overlaid state from the front and back sides between the lower surface of the head part 60 of the pin 40 and the two first catches 81.

On the other hand, to remove the attachment apparatus 10 from the panel holes 21, 31, the head part 60 of the pin 40 may be rotated. That is, although it is not illustrated, when the blade of a minus or straight-edge screw driver is inserted into the operating part 61 of the head part 60 and rotated, the two first catches 81 respectively meet the respective meeting parts 53 which are positioned forward in the rotational direction. Here, when the head part 60 is further rotated, each first catch 81 is pushed by each meeting part 53 which is positioned forward in the rotational direction, and as shown in FIG. 11, each first catch 81 bends inward.

Because of this, the two first catches 81 respectively retract from the two open parts 52, whereby the coupled state of panel holes 21, 31 is released. In this state, although it is not illustrated, the grommet 50 can be pulled out from the two panel holes 21, 31. When the grommet 50 is pulled out, although it is not illustrated, it becomes possible to separate the two panels 20, 30.

Because the present invention is constituted in the above manner, it performs the effects as described below.

In the first aspect of the invention, the first catch can be contracted assuredly by rotating the pin. In the second aspect of the invention, in addition to the above-mentioned effect of the invention described in the first aspect, the pin can be rotated easily via the operating part. In the third aspect of the invention, in addition to the above-mentioned effect of the invention described in the first or second aspect, the first catch can easily contract.

In the fourth aspect of the invention, in addition to the above-mentioned effect described in any of the first to third aspects, because the leg part of the pin is held inside the insertion hole of the grommet, the leg part of the pin is not accidentally pushed from outside, and escape of the pin from the grommet can be prevented in advance. In the fifth aspect of the invention, in addition to the above-mentioned effect described in any of the first to fourth aspects, a clicking feeling or jointed feeling can be given during the rotation of the pin. In the sixth aspect of the invention, in addition to the above-mentioned effect described in any of the first to fifth aspects, escape of the pin can be prevented assuredly by the fact that the second catch of the pin is inserted into the open part of the grommet.

While the invention has been explained with reference to the specific embodiments of the invention, the explanation is illustrative and the invention is limited only by the appended claims.

What is claimed is:

1. A component attachment apparatus for attaching a component in a panel hole of a panel, comprising:

a grommet to be inserted into the panel hole to be incapable of rotation, and having an insertion hole, an open part extending outwardly to cross the insertion hole, and a meeting part formed at least one side of the open part along the insertion hole, and a pin including a head part larger than the insertion hole, and a leg part extending from the head part and inserted into the insertion hole of the grommet to be capable of rotation, said leg part having a first catch elastically projecting outward in a radial direction from an outer perimeter of the leg part to couple with the panel hole, and a second catch positioned near a tip of the leg part than the first catch for preventing escape of the leg part from the insertion hole so that when the pin with the leg part is inserted into the insertion hole, the first catch is positioned in the open part to engage the panel, and when the pin is rotated, the first catch is pushed inward by the meeting part.

2. A component attachment apparatus according to claim 1, wherein said head part of the pin includes an operating part for allowing rotational operation of the pin.

3. A component attachment apparatus according to claim 1, wherein said meeting part of the grommet includes an inclined surface for meeting the first catch with an incline.

4. A component attachment apparatus according to claim 1, wherein said leg part of the pin is held inside the insertion hole of the grommet.

5. A component attachment apparatus according to claim 1, wherein the leg part of the pin includes on an outer periphery thereof one of an indented part and a raised part, and the grommet includes on an inner periphery of the insertion hole the other of the raised part and the indented part for coupling with the other in a state in which the first catch is inserted in the open part.

6. A component attachment apparatus according to claim 1, wherein said grommet includes a cut-out part at a tip thereof to receive the second catch of the leg in the state where the first catch is inserted into the open part.

7. A component attachment apparatus according to claim 6, wherein said leg part includes a cylindrical first leg having the first catch, and a cylindrical second leg having the second catch, said second leg having a diameter smaller than that of the first leg and projecting from the first leg.

8. A component attachment apparatus according to claim 7, wherein said grommet includes a side wall surrounding the insertion hole and having said open part, and a hole smaller than that of the insertion hole for receiving the second leg.

* * * * *